Patented Aug. 31, 1926.

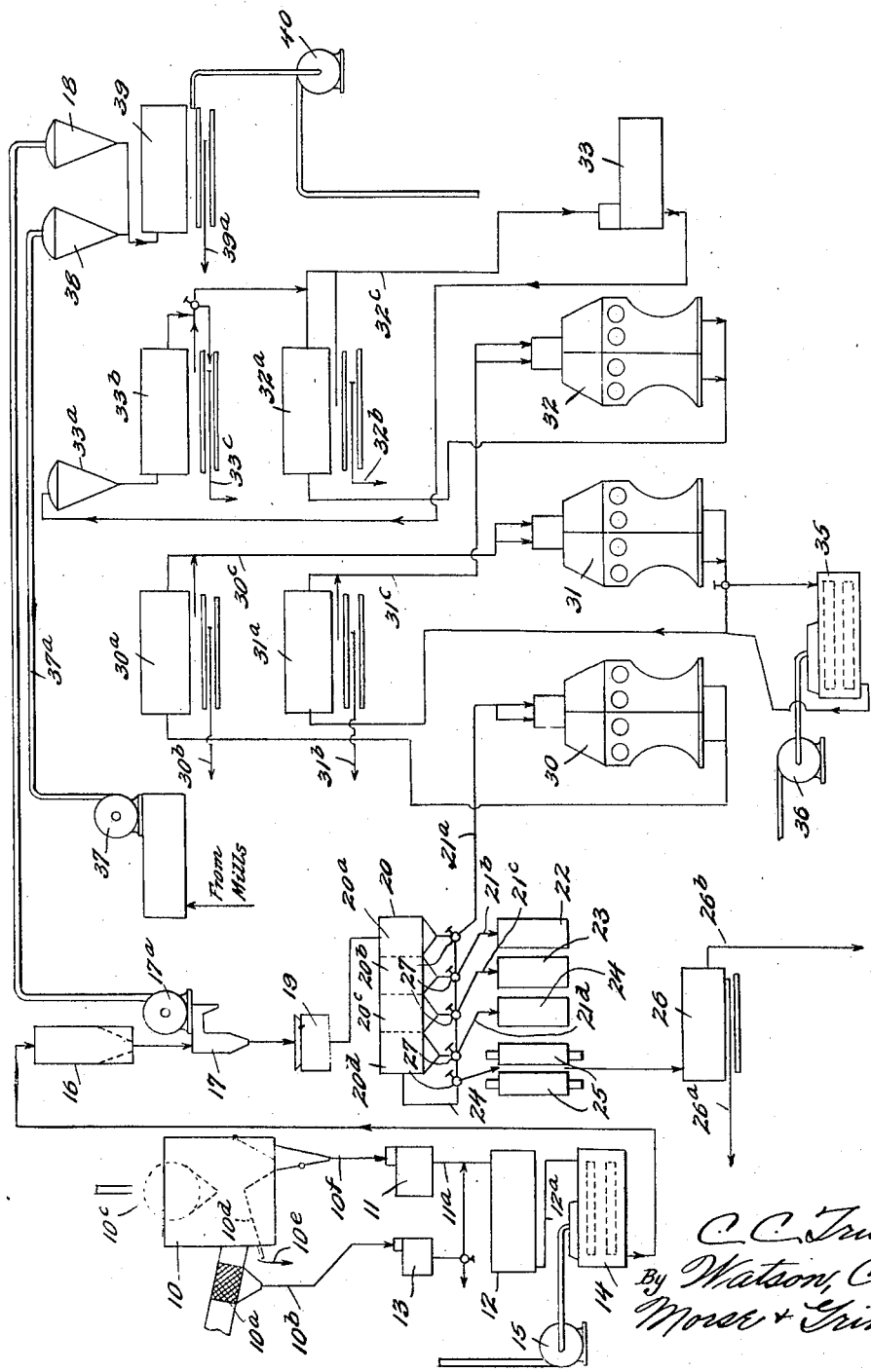

1,598,328

UNITED STATES PATENT OFFICE.

CHARLES C. TRUAX, OF COLUMBUS, OHIO.

PROCESS OF TREATING CORNCOBS TO PRODUCE COMMINUTED MATERIAL OR MEAL.

Application filed July 1, 1924. Serial No. 723,581.

This invention relates to a process for treating corn cobs to produce therefrom a finely comminuted material or meal of any desired degree of fineness. I have found that such material may be employed in different forms for a wide variety of useful purposes. In some cases, it may be used in the form of finely divided material or meal, the degree of fineness depending upon the purpose in view, and in others it is rolled, molded, formed or pressed into flakes, sheets, cubes, or other shapes, depending on the use to which it is to be put. For example, this material may be used in the place of ground cork in the manufacture of linoleum or floor coverings; as an ingredient of such articles as wall board, plaster board, composition roofing, clay products, core binders, fiber containers, dynamite, etc.; it forms a good insulating or packing material capable of use to line walls of buildings for warmth and proof against sound and moisture; as packing material for thermos bottles, fireless cookers, life preservers, swimming jackets, and in the manufacture of any article requiring packing or insulating materials. It has been found particularly useful in the drying and polishing of aluminum, tin plate and other metal products. It may form a desirable ingredient of various kinds of cattle and poultry feeds. The absorptiveness of this comminuted material or meal and its high percentage of carbonhydrates (when used to adsorb oil in drying and polishing metal products having no injurious chemicals thereon) makes it a most excellent food or food ingredient for cattle consumption after it has completed its service as a drying and polishing material. When it is desired to get the material or meal into a compact condition, I have found that it can be rolled or pressed or molded or formed into any desired shape, such as flakes, cubes, sheets or other forms, and that the material itself, under proper conditions, contains sufficient adhesive elements to bind together the different particles into a compact mass. The result is that the corn cobs which ordinarily form a valueless and detrimental by-product around corn shellers, elevators, mills, etc., may be converted into products and material possessing considerable value and wide commercial utility.

Heretofore, so far as I am aware, no satisfactory process has been devised for making a commercially useful material from corn cobs and a material capable of successful use for the various purposes above pointed out. The present invention aims to provide a process of that kind by which the cobs may be rapidly and successfully converted into comminuted material or meal of any desired consistency which can be employed for the production of the various forms, shapes, and sizes above noted, capable of use for the wide variety of purposes indicated and which can be shipped and stored without substantial danger of spoiling or deterioration.

For the purpose of carrying out my process on a commercial scale, I have devised and arranged apparatus for treating the cobs in commercial quantities. The accompanying drawings illustrate in a diagrammatic way sufficient of this apparatus to enable the process to be understood. Numerous details of the apparatus have been omitted as unnecessary, and it is of course apparent that other apparatus similar to that shown may be employed at various points in the process.

Referring to the accompanying drawings, 10 indicates a separator commonly called a "shoe" into which the cobs are first fed. This separator is provided with a screen indicated at $10^a$ through which any shelled corn or fine pieces of cob may pass, such material being conducted away from the separator through a conduit indicated at $10^b$. A suction fan $10^c$ is provided in the separator 10, this fan serving to remove pieces of shucks and other light material and chaff from the cobs. This fan also serves the function of separating the cobs from heavy foreign material, such as iron, stones and the like, the cobs being lifted over an elevation indicated at $10^d$, while the heavy particles pass out of the separator through a conduit indicated at $10^e$.

After being thus cleaned and separated from foreign materials, the cobs are conducted through a conduit indicated at $10^f$ to a suitable grinding or pulverizing mill 11. This mill may be what is commonly termed a "single-head attrition mill," but any suitable form of mill which will properly break or grind or crush the cobs and reduce them to the desired degree of fineness may of course be employed. From the mill 11 the ground cobs are conducted through a suitable conduit $11^a$ into a bolting reel 12.

The fine particles of cob and shelled corn escaping through the conduit 10^b may, if desired, be led to a separate grinder or crusher indicated at 13, and this material after being ground may also be led into the bolting reel 12, or if desired conducted away for other use.

The mill or grinder 11 is preferably arranged so as to convert the cobs into a material in which the particles will be about the size of a large pea, or so as to pass through a three-eighths inch mesh. The reel is provided with coarse cloth of a mesh sufficient to pass all the material which it is desired to use. The coarser material not passing through this reel is discarded and may be conducted to the furnace.

After such preliminary grinding and screening of the material, it is subjected to heat being conducted from the reel 12 through a suitable conduit 12^a into a suitable roaster or heater 14. I prefer to employ a heater or roaster consisting of a casing containing a rotating drum and suitable steam pipes or coils, the material being caused to travel through the drum from one end of the casing to the other as the drum is rotated. A suction fan 15 is preferably employed to remove from the heater the moisture liberated from the material.

This step of heating and partially drying the crushed cobs is an important one in my process. The cobs contain considerable adhesives and moisture, and if not properly heated and dried the material cannot be satisfactorily ground and treated in the subsequent machinery, because it tends to form into compact masses or cakes, that is, it mashes and the particles have a tendency to stick together instead of properly forming into the desired material or breaking up into granular particles and meal. Furthermore, such heating greatly facilitates forming the material into flakes, cubes, sheets, etc., where such compact forms are desired.

On the other hand, a certain amount of moisture is desirable in the material, as it prevents the same from becoming pulverized and reduced to the form of dust. I have found that a moisture content of from 7 to 15% is preferable, as this allows the material to be formed, shaped, cubed, flaked, or cut up into granular form or ground into fine meal and at the same time preserves its keeping quality. In addition, I have found that by heating the material and subjecting it to the subsequent operations of grinding or forming or crushing or rolling it into the desired compact mass while it retains a certain degree of heat and moisture, a better and more uniform product is produced and the grinding and bolting and other operations are more easily carried out.

From the heater 14, the material is preferably conveyed into a storage bin 16 from which it is led into an aspirator 17 provided with a suction fan 17^a for removing light particles from the cob material, such light particles being preferably conveyed to an ordinary cyclone dust collector indicated at 18. From the aspirator 17 the material is preferably led through a magnetic separator 19, of ordinary construction, which serves to separate from the cob material particles of metal which are liable to injure the subsequent machinery.

The material is now ready for subsequent treatment. For some purposes, I have found that the material should be in coarser particles than for others. In some cases it is desirable for the best results to use a mixture of materials with the different parts having a different degree of fineness. To obtain a material or mixture of the desired character in any particular case, I may therefore subject the material at this stage to a sorting operation. For this purpose, I use a bolting reel 20 provided with several sections of wire mesh indicated as 20^a, 20^b, 20^c and 20^d, the size of the wire mesh increasing from the end 20^a to the end 20^b. The material taken off through section 20^a is preferably led through a pipe 21^a and subjected to further grinding and bolting operations as later described. From the sections 20^b, 20^c and 20^d, conduits 21^b, 21^c and 21^d conduct the material of different sizes to any desired point of use or to bins indicated at 22, 23 and 24.

The material in these bins is of such a size as to be advantageously used for making, forming, pressing or molding compact masses, cubes, forms or sheets, the coarser particles, of course, producing coarser products. The coarse material escaping from the reel 20 as indicated at 24 I preferably employ for making flakes, and for such purpose the material is passed through smooth rolls indicated at 25. As the flakes are formed, they are preferably passed through a bolting reel 26 which screens out the finer particles indicated as passing through the conduit 26^a to a bin, or if desired to one of the milling machines later described. The finished flakes escape from the reel 26 through a conduit 26^b to any suitable storage bin.

In forming the material into flakes, cubes, sheets or other masses, I have found it desirable to mix together coarser and finer material. Thus in making flakes from the coarser particles escaping through the conduit 24, it may be found advantageous to add thereto some of the finer material passing through the sections 20^a, 20^b, 20^c or 20^d of the reel. Likewise in making the sheets, cubes or solid masses, better results may sometimes be secured by mixing materials of different grades of fineness. To facilitate this mixing of the materials of different grades of fineness, I provide a transverse conduit or conveyor 27 containing suitable valves by which the material escaping from any one of the sections of the reel 20 may be conducted into any one of the conduits 21ª, 21ᵇ, 21ᶜ, 21ᵈ or 24.

As previously noted, it is desirable for some purposes to reduce the cob material into the form of a fine meal. For the grinding operation, I prefer to use a plurality of well known roller mills, preferably double roller mills. Three of these mills are shown indicated at 30, 31 and 32. For the final grinding operation, I prefer to use what is commonly known as a hammer mill, one of these being indicated at 33.

The material which is taken from the section 20ª of the reel 20 through the conduit 21ª and which is to be subjected to a further grinding operation, is first led through both sides of the double roller mill 30. It is also to be understood that by adjusting the valves in the conduit 27, the material from the other sections of the reel 20 may be led into the conduit 21ª. From the mill 30, the material passes to the bolting reel 30ª, which is of the kind commonly used in grain mills. The finer particles escaping from this reel may be led through a conduit indicated at 30ᵇ to any suitable bin for receiving the finished product. The coarser material from this reel is led through a conduit 30ᶜ into the second roller mill 31, preferably passing through both sides thereof. From this mill, the material is conveyed to a bolting reel 31ª where the finer particles are separated and conducted through a suitable conveyor 31ᵇ to the storage bin. The coarser particles from this reel 31ª are conducted through a suitable conduit 31ᶜ to the next roller mill 32, and after passing through the same is preferably led to a bolting reel 32ª. The finer products escaping from this reel through a conduit 32ᵇ are also led into the storage bin for the finished material, and the coarser particles from the same are led through a conduit 32ᶜ to the last grinding mill 33, which, as heretofore stated, is preferably of the hammer type. From the mill 33, I prefer to conduct the material through a cyclone separator 33ª which removes the dust therefrom and then through a bolting reel 33ᵇ from which the finer material escapes through a conduit 33ᶜ to the bin for the finished material, and the coarser products from which may be led into the conduit 32ᶜ and thus caused to pass again through the mill 33.

I have found that it is sometimes desirable or necessary to subject the material to a second heating operation during its treatment in the grinding mills. To effect this result, a heater 35 similar to the heater 14 is connected to the outlet of the mill 31 so that if desired the material escaping from this mill may be passed through this heater before it is led to the bolting reel 31ª. The heater 35 is also provided with an exhaust fan 36 for removing heat therefrom.

It is generally desirable to have an exhaust fan connected to the roller mills 30, 31 and 32 for removing dust therefrom, and in the drawings I have shown an exhaust fan 37 which may be connected by suitable conduits (not shown) to each of the roller mills, a conduit 37ª connecting this fan to a cyclone separator 38. If desired, a bolting reel 39 may be connected to the separators 18 and 38 so that any material which passes through said separators will be screened by this reel 39 and the finished product therefrom may be conducted through a suitable conduit 39ª to the bin for finished material. A suction fan 40 is shown connected to the end of the bolting reel 39 which serves the purpose of taking any waste material therefrom and conveying it to the furnace.

It is sometimes found desirable to subject the cobs to a preliminary heating before the first grinding or crushing operation. This is particularly true where the cobs are green or contain a great deal of moisture. Such preliminary heating may be carried out by any well known apparatus, such as an inclined rotating drum which is externally heated, as by steam coils, and through which the cobs are caused to slowly travel.

It is, of course, to be understood that various forms of apparatus may be used instead of that described, and that the number of grinding operations and other details of procedure may be varied, depending upon the character or fineness of meal it is desired to produce.

What I claim as my invention and desire to secure by Letters Patent is:

1. The process of making comminuted material or meal from corn cobs, which consists in crushing the cobs, heating the crushed material to remove moisture therefrom, partially grinding the material in a suitable mill, separating from said partially ground material the finer portions, conducting the coarser portions to another mill and further grinding the same to reduce them to the desired degree of fineness.

2. The process of making comminuted material or meal from corn cobs, which consists in crushing the cobs, heating the crushed material to remove moisture therefrom, subjecting the material to a plurality of grinding operations by passing the same through a plurality of successive grinding mills, bolting the material after each to separate the finer and coarser products and passing the coarser products to the succeeding grinding mill.

3. The process of making comminuted material or meal from corn cobs, which consists in crushing the cobs, heating the crushed material to remove moisture therefrom, grinding the material in a suitable mill, separating the coarser from the finer portions of the ground material, further grinding such coarser portions in a second grinding mill, subjecting the same after grinding to a second heating operation to remove moisture therefrom, and then further grinding the same in a third grinding mill to the desired degree of fineness.

4. The process of making from corn cobs a comminuted material for use in producing a solid mass or cake of such material, which consists in crushing and grinding the cobs, screening the crushed material to separate the same into a plurality of portions having different degrees of fineness, and then mixing with one of such portions the material from another portion having a different degree of fineness.

5. The process of making a compact mass from corn cobs which consists in crushing and grinding the cobs, drying the resultant material by subjecting it to heat, and then screening the crushed material to separate the same into different portions having different degrees of fineness, mixing a plurality of portions having different degrees of fineness and pressing the mixture into a compact mass.

6. The process of forming a compact mass of desired shape from corn cobs, which consists in crushing and grinding the cobs to form a comminuted material or meal, heating such comminuted material to partially dry the same, and then subjecting such material to pressure to cause the adhesive elements thereof to bind the material into a compact mass.

In testimony whereof I hereunto affix my signature.

CHARLES C. TRUAX.